United States Patent
Kim et al.

(10) Patent No.: US 8,787,914 B2
(45) Date of Patent: Jul. 22, 2014

(54) METHOD OF OPERATING CLOSED-MODE BASE STATION AND NON-SUBSCRIBER TERMINAL

(75) Inventors: Jun Sik Kim, Daejeon (KR); Kyong Tak Cho, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 160 days.

(21) Appl. No.: 13/335,805

(22) Filed: Dec. 22, 2011

(65) Prior Publication Data

US 2012/0165017 A1    Jun. 28, 2012

(30) Foreign Application Priority Data

Dec. 23, 2010  (KR) .................. 10-2010-0133144

(51) Int. Cl.
  *H04W 36/00*  (2009.01)
  *H04W 48/06*  (2009.01)
  *H04W 52/02*  (2009.01)
  *H04W 84/04*  (2009.01)
  *H04W 48/10*  (2009.01)

(52) U.S. Cl.
  CPC .......... *H04W 48/06* (2013.01); *H04W 52/0206* (2013.01); *H04W 84/045* (2013.01); *H04W 48/10* (2013.01)
  USPC ....................................... 455/436; 455/422.1

(58) Field of Classification Search
  USPC ............... 455/418, 422.1, 436, 446, 450, 453
  See application file for complete search history.

(56) References Cited

U.S. PATENT DOCUMENTS

| | | | |
|---|---|---|---|
| 2009/0005099 A1 | 1/2009 | Jung et al. | |
| 2009/0131049 A1 | 5/2009 | Osborn | |
| 2010/0296426 A1 | 11/2010 | Lee et al. | |
| 2011/0111766 A1* | 5/2011 | Yang et al. | 455/452.2 |
| 2012/0165027 A1* | 6/2012 | Kim et al. | 455/446 |

FOREIGN PATENT DOCUMENTS

| | | |
|---|---|---|
| KR | 1020090006711 | 1/2009 |
| KR | 1020100092397 | 8/2010 |

* cited by examiner

*Primary Examiner* — Sam Bhattacharya
(74) *Attorney, Agent, or Firm* — H.C. Park & Associates, PLC

(57) ABSTRACT

A method of operating a closed-mode base station, includes broadcasting an interference preamble for providing a notification of an interference situation via a broadcast of system information; checking current service status of the closed-mode base station when the interference situation is reported from a non-subscriber terminal entered a service area of the closed-mode base station; and avoiding the interference situation based on the checked current service status.

17 Claims, 6 Drawing Sheets

METHOD OF OPERATING CLOSED-MODE BASE STATION AND NON-SUBSCRIBER TERMINAL

CROSS-REFERENCE TO RELATED APPLICATION(S)

The present invention claims priority of Korean Patent Application No. 10-2010-0133144, filed on Dec. 23, 2010, which is incorporated herein by reference.

FIELD OF THE INVENTION

The present invention relates to the operation of a closed-mode base station and a non-subscriber terminal and, more particularly, to a method of operating a closed-mode base station and a non-subscriber terminal, capable of avoiding the interference of the non-subscriber terminal with the surrounding closed-mode micro-base stations and increasing the utilization of a frequency resource, thereby improving the Quality of Service (QoS) of wireless communication.

BACKGROUND OF THE INVENTION

As is well known, a femtocell is a small-sized cell having a radius which ranges from 10 to 20 m. The concept of a femtocell is distinguishable from the concept of a macrocell which is a typical cell supported by a service provider. In general, the femtocell is designed to support being used in a small-sized apace such as a home or small business.

A micro-base station is installed in an indoor area such as a home or an office. The micro-base station is integrated with a network, so that it ensures mobility and the transmission of a large amount of data, expands the service areas available to mobile communication, improves the performance of a user service, increases the capacity of a base station, and supports a variety of inexpensive mobile communication services for a user. Furthermore, in an environment where the radius of a cell has been limited to within a minimum of space such as a room of a home or an office, the micro-base station actively responds to a user's demand, reduces the Capital Expenditure (CAPEX)/Operational Expense (OPEX) of a service provider by reducing the time it takes to install an additional cell and the operating cost, creates a new market for equipment manufacturers, and provides a wireless environment in which the improvement of the quality of the user service has been taken into consideration.

Such micro-base stations are installed in response to users' demands rather than the planned design of service providers. Accordingly, when a micro-base station is additionally installed, there is required a technology for base station self-establishment in which the initial base station self-configuration of creating installation parameters is performed on a basis of the internal configuration and a technology for base station self-configuration in which the identification of an adjacent base station, the setting/registration of relations and the setup of a connection to a core network are performed prior to operation of the base station. Additionally, there needs a technology for base station operation self-optimization which controls the intensity of signals from the base station and which optimizes handover parameters using information about the types of signals and traffic between the base station and a surrounding base station.

Furthermore, femtocells support the concept of a Closed Subscriber Group (CSG) which allows only the users of a group of authorized users to enter a network. Femtocells that support the concept of a CSG may assign unique IDs, which are referred to as CSG IDs. A femtocell cannot transmit a wireless signal until installation and configuration have been finished. If serious spectral interference occurs in the surroundings after the femtocell was installed, the femtocell may stop providing service. Furthermore, the reconfiguration of the network of a service provider resulting from the installation of a new femtocell is prohibited, and the influence that the installation causes must be minimized.

A micro-base station supports three user access modes, which are open mode, closed mode, and hybrid mode. First, open access mode allows service to all subscribers regardless of the state of subscription to a CSG, and is the same as the operating mode of a macrocell base station when the concept of a femto-base station is not applied. Second, closed user access mode provides service only to subscribers to a CSG, and a cell which supports such closed user access mode is referred to as a CSG cell. Finally, hybrid user access mode allows a CSG subscriber closed operation, and allows a CSG non-subscriber open operation, and is a mixture of the above two modes. When users in two modes are connected, service is provided to a CSG subscriber first.

A CSG cell includes a CSG ID in system information, and then broadcasts the system information. Optionally, a CSG cell may broadcast a CSG designator. A CSG cell can be identified by obtaining a Physical Cell ID (PCI), that is, a cell ID in a physical layer, during a process where the CSG cell is being synchronized with a preamble in the physical layer. Since the PCI is identical to the value of the preamble defined in the physical layer, the PCI can be obtained while the terminal is being synchronized with the cell. The range of the PCIs of CSG cells has been reserved by a system or a service provider.

The service provider may adjust especially some cell selection parameters, such as the Q-offset or Q-hyst, for a specific CSG cell. This may be used as a strategy to fix the selection of a cell to a CSG cell in order to overcome a ping-pong problem in which a terminal repeats the selection of a cell and the changing of a cell between a macrocell and a CSG cell. Furthermore, that may also be used as a strategy for inducing a terminal near a CSG cell to select the CSG cell as a cell in order to solve the problem of interference between cells.

Hybrid user mode may be adapted to provide the CSG service to employees within a building, such as a shopping mall, and to provide open/shared service to customers. In this case, a shopping mall owner may make a special contract for fees and use with a communication service provider. Not only can the owner of a micro-base station provide inexpensive communication service to employees, but the communication service provider can also achieve the effect of eliminating a shading area or the expansion of coverage. Accordingly, as described above, the hybrid user mode enables mutual benefits to be achieved.

Recently, a hybrid cell is attracting attention as a method for avoiding interference. A terminal other than a CSG subscriber terminal is located near a CSG cell, access to the CSG cell is not allowed, and therefore the terminal continuously stays in a macrocell. In this case, the upstream link signal of the terminal causes serious interference to the CSG cell. Accordingly, if such a terminal is allowed to enter a CSG cell, this can result in the effect of considerably avoiding interference. This indicates that the concept of a hybrid cell is not only used in a company such as a shopping mall, but is also used in a home in order to reduce the interference which is imposed on a user.

A base station which operates in hybrid access mode should minimize the influence it has on existing CSG subscribers. That is, when a hybrid cell has allowed a non-subscriber other than a CSG subscriber to enter itself for the reason of coverage or interference, it has to ensure the normal processing of an access request when an existing CSG subscriber makes an access request. In this case, the data transfer rate of an existing terminal operating in hybrid access mode should be reduced, the existing terminal should be handed over to another site, or, in some cases, the access of the existing terminal may be cancelled.

When a terminal receives a rejection notification from a CSG cell when attempting to access the cell, the terminal should delete the CSG ID of the corresponding cell from an allowable CSG list which is managed by the terminal. In contrast, when a terminal obtains permission from the CSG cell to access a CSG cell which is absent from an allowable CSG list (which is possible in the case of the manual selection of a CSG cell), the terminal should newly add the CSG ID of the corresponding cell to the CSG list.

The use of a femtocell must be the same as the use of a typical macro-base station in terms of user experience. Furthermore, the load of registration or paging attributable to the use of a femtocell should be minimized. Furthermore, the use of a femtocell must not influence the performance, coverage and capacity of an existing base station.

As described above, a femtocell or a micro-base station defines three operating modes: open mode which allows all terminals to have access, closed mode which allows only authorized subscribers to have access, and hybrid mode which provides discriminative service to a non-subscriber. A femtocell which operates in closed mode does not need to provide service to an unconcerned terminal.

However, when cells which operate in closed mode are densely deployed, a non-subscriber terminal should communicate with a relatively remote macrocell and therefore strong power is required. Interference attributable to the strong power incurs a reduction in QoS which is provided to a micro-base station subscriber. Furthermore, there is a problem in that a non-subscriber terminal undergoes an interruption in a call or cannot appropriately receive a control channel because of the interference of a surrounding base station in closed mode.

SUMMARY OF THE INVENTION

In view of the above, the present invention provides a method which provides an agreed preamble indicative of an interference situation to a terminal if it is determined that the intensity of signals received from an inaccessible closed-mode base station is higher than that of signals received from base stations, so that the transmission power of a femtocell can be reduced.

Further, the present invention provides a method which avoids the interference of a non-subscriber terminal based in light of the connection between a terminal device for collecting information about a surrounding wireless environment and a micro-base station device and the situation of a surrounding cell.

In accordance with a first aspect of the present invention, there is provided a method of operating a closed-mode base station, including:

broadcasting an interference preamble for providing a notification of an interference situation via a broadcast of system information;

checking current service status of the closed-mode base station when the interference situation is reported from a non-subscriber terminal entered a service area of the closed-mode base station; and avoiding the interference situation based on the checked current service status.

In accordance with a second aspect of the present invention, there is provided a method of operating a non-subscriber terminal requesting a service within a service area of a closed-type base station, including:

searching a surrounding wireless environment;

if the closed-mode base station is detected, measuring intensity of signals received from the closed-mode base station;

comparing the intensity of the signals received from the closed-mode base station with the intensity of signals received from a currently accessed base station; and if the intensity of the signals received from the closed-mode base station is higher, reporting an interference situation to the closed-mode base station.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings so that they can be readily implemented by those skilled in the art.

In accordance with an embodiment of the present invention, a closed-mode base station broadcasts an agreed preamble indicative of an interference situation, a terminal, when being subjected to an interference situation in a cell area to which the terminal has not subscribed, reports an interference situation to the closed-mode base station by transmitting the agreed preamble using a random access procedure, and power control is induced to be performed, thereby providing service to a macro cell connected terminal without hindrance. The intensity of signals from a surrounding cell and system information are analyzed, and then optimized operation is performed.

Figure 1:
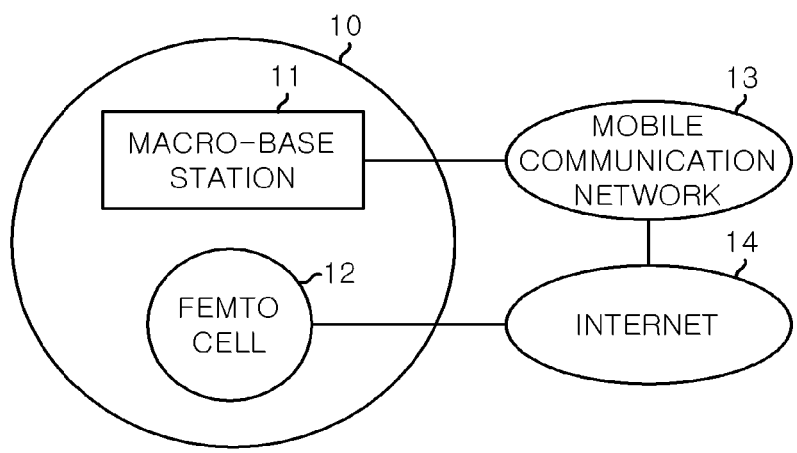
FIG. 1 is a diagram illustrating the configuration of a mobile communication system including a micro-base station in charge of a femtocell.

FIG. 1 is a diagram illustrating the configuration of a mobile communication system including a micro-base station 12 in charge of a femtocell.

As shown in FIG. 1, a micro-base station in charge of a femtocell 12 is installed within the coverage of a macro-base station 11 in charge of a macrocell 10, and is connected to a mobile communication network 13 via the wired Internet 14.

Figure 2:
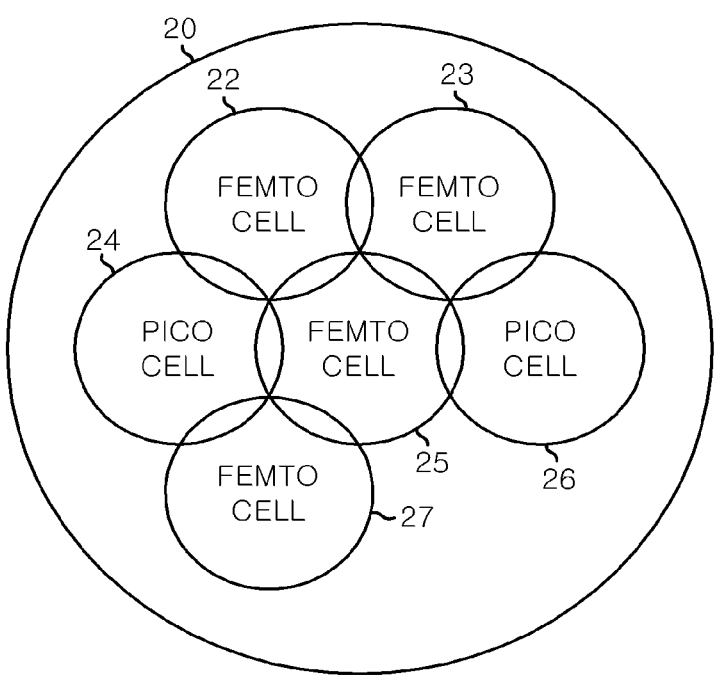
FIG. 2 is a diagram showing a macro cell in which a micro-base station in charge of a femtocell has been newly installed.

FIG. 2 is a diagram showing a macro cell in which a micro-base station in charge of a femtocell has been newly installed.

As shown in FIG. 2, a femtocell 27 is newly installed adjacent to existing femtocells 22, 23 and 25 or picocells 24 and 26 within a macrocell 21. The femtocell 27 performs a random access procedure in an initial stage or during its operation in order to obtain upstream link synchronization and upstream link wireless resources. In this case, it is necessary to avoid the use of a preamble which is being used in adjacent or neighboring cells, in order to prevent a collision between preambles, that is, signatures. In particular, in the case of a micro-base station in charge of a femtocell, random access preambles may be fixedly assigned to terminals registered with the micro-base station and then the terminals registered with the macro-base station may perform the random access procedure in non-competitive fashion.

Figure 3:
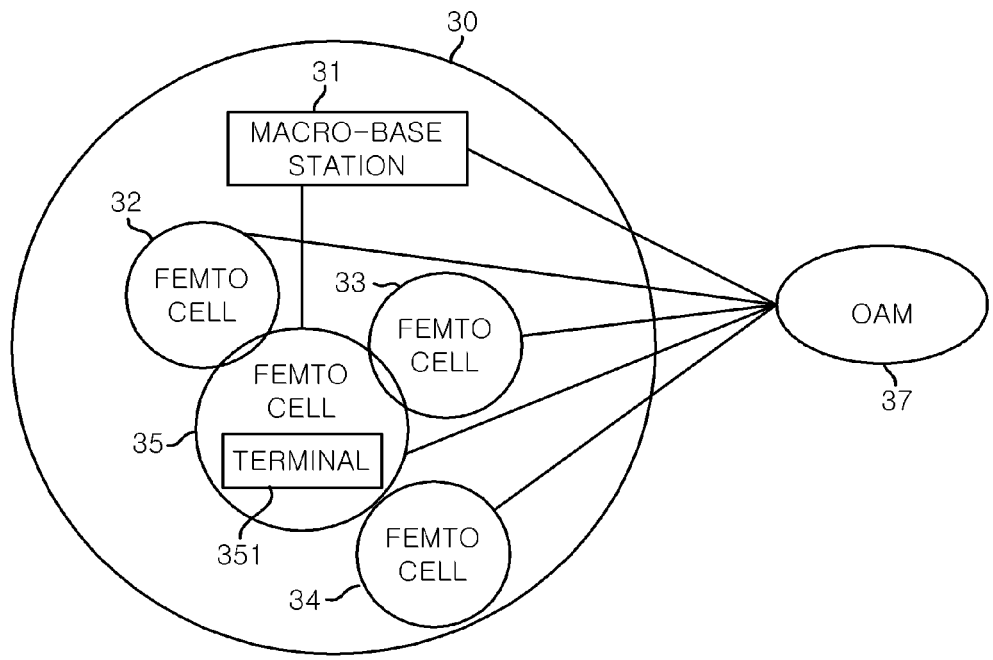
FIG. 3 is a diagram illustrating the relationship between a newly deployed micro-base station and the surrounding stations.

FIG. 3 is a diagram illustrating the relationship between a newly deployed micro-base station and the surrounding stations.

As shown in FIG. 3, a micro-base station (not shown) in charge of a femtocell 35 is newly installed in a macrocell 35. The newly installed micro-base station in charge of the femtocell 35 may collect information about surrounding cells from a terminal 351 within in a service area or the surrounding stations, for example, a macro-base station 31, and micro-base stations in charge of femtocells 32, 33 and 34. More specifically, the micro-base station in charge of the femtocell 35 collects information about the surrounding cells from the surrounding stations by using a specific interface or by adding the functionality of collecting information to the micro-base station in charge of the femtocell 35 to directly receive information about the micro-base stations in charge of the surrounding femtocells 32, 33 and 34 from the terminals, thereby enabling the information about the surrounding cells to be effectively collected and determined. A micro-base station authorized by a service provider dynamically operates an operating mode based on the amount of variation in the received signal and CQI information of a terminal 351 currently using service which are derived from the collected information about the surrounding cells. The changed information about the micro-base station in charge of the femtocell 35 is reported to an Operations, Administration and Maintenance (OAM) 37, and is used to manage the overall network. Alternatively, based on information collected by the OAM 37, a service provider additionally installs an open or hybrid base station in order to reduce the influence of interference, caused by a non-subscriber terminal, in an area where closed-mode base stations have been densely installed.

Figure 4:
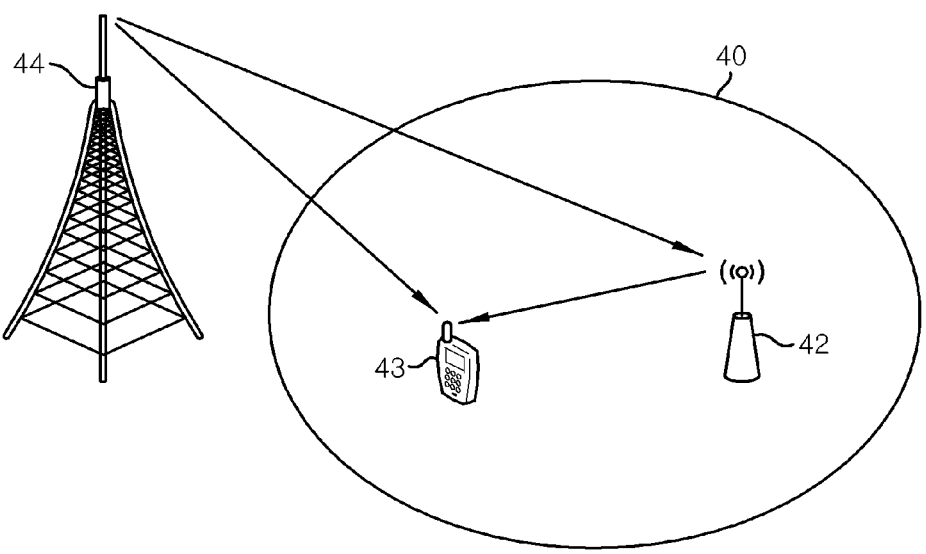
FIG. 4 exemplary illustrates a situation where a closed-mode micro-base station experiences interference.

FIG. 4 exemplary illustrates a situation where a closed-mode micro-base station experiences interference.

As shown in FIG. 4, when a non-subscriber terminal 43 enters a service area 40 of a closed-mode micro-base station 42 while making a call, or enters the service area 40 of a closed-mode micro-base station 42 and then attempts to make a call, the non-subscriber terminal 43 cannot use the service if the terminal 43 is not a subscriber to the closed-mode micro-base station 42. Accordingly, the non-subscriber terminal 43 needs to request or receive service from a remote micro-base station or macro-base station 44, and therefore relatively strong transmission and reception power is required, which causes great interference to the closed-mode micro-base station 42.

Figure 5:
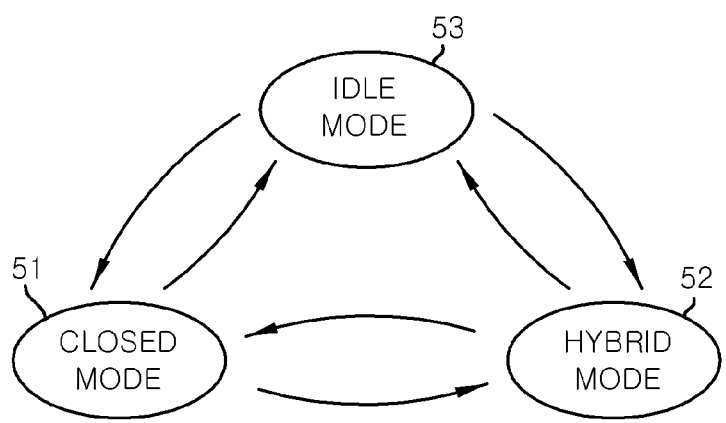
FIG. 5 is a state transition diagram illustrating an operating mode when the dynamic operation of a micro-base station has been authorized by a service provider.

FIG. 5 is a state transition diagram illustrating the operating mode when the dynamic operation of a micro-base station has been authorized by a service provider.

As shown in FIG. 5, the closed-mode micro-base station, for example, the micro-base station 42 basically operates in closed mode 51, and transitions to hybrid mode 52 when it is determined that serious interference occurs based on the results of the measurement of a wireless environment. When there is no terminal making a request of service in closed or hybrid mode, the closed-mode micro-base station 42 transitions to idle mode 53 where a reception function is used and only broadcast information having a period longer than a basic period is sent. The closed-mode micro-base station 42 then waits until a user requests the service in the service area of the closed-mode micro-base station 42 while minimizing the imposition of interference on surrounding base stations by adjusting broadcast information.

Figure 6A:
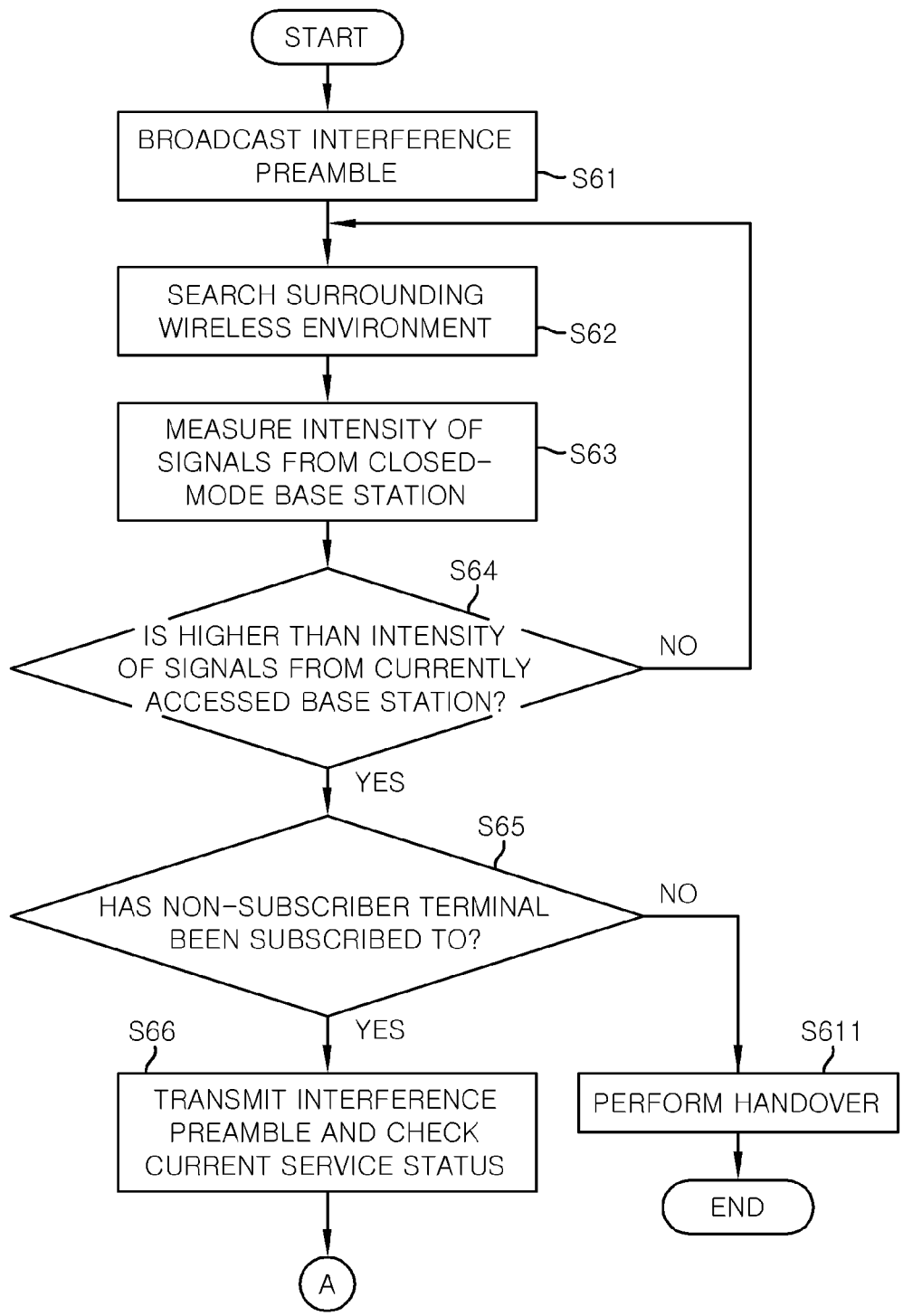
FIGS. 6A and 6B are a flowchart illustrating the process of avoiding the interference of a non-subscriber terminal in the service area of a closed-mode base station with reference to FIG. 4.
Figure 6B:
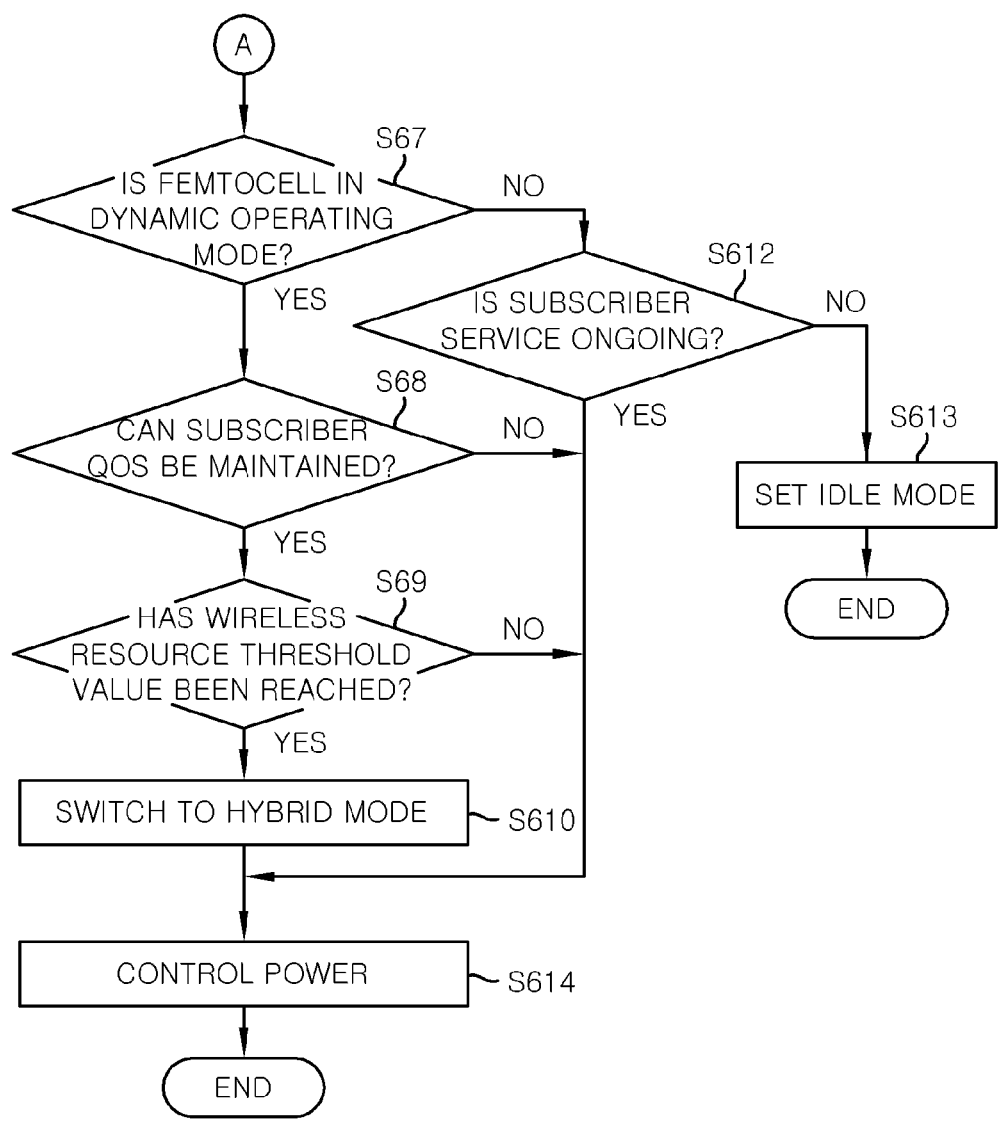

FIGS. 6A and 6B are flowcharts illustrating the process of avoiding the interference of a non-subscriber terminal in the service area of a closed-mode micro-base station with reference to FIG. 4.

First, at step S61, the closed-mode micro-base station 42 broadcasts an agreed interference preamble which enables the non-subscriber terminal to provide notification of its interference situation. That is, this step is to set an interference preamble that is used to provide notification of an interference situation using the broadcast of system information.

The non-subscriber terminal 43 searches a surrounding wireless environment and measures the intensity of signals received from surrounding base stations 44 at step S62, and measures the intensity of received signals when a closed-mode micro-base station 42 is detected at step S63.

The non-subscriber terminal 43 compares the intensity of signals received from a currently accessed base station with the intensity of signals received from the closed-mode micro-base station 42 at step S64, and determines whether the closed-mode micro-base station 42 has been subscribed to if it is determined that the intensity of signals received from the closed-mode micro-base station 42 is higher than that of signals received from a currently accessed base station at step S65.

If the non-subscriber terminal 43 has been subscribed to the closed-mode micro-base station 42, a typical handover procedure will be performed at step S611. In contrast, if it is determined that the non-subscriber terminal 43 has not been subscribed to the closed-mode micro-base station, the non-subscriber terminal 43 reports an interference situation by transmitting the interference preamble using a random access procedure, and the closed-mode micro-base station 42 checks the current service status when receiving the interference preamble at step S66.

Thereafter, it is determined whether the femtocell 40 is in dynamic operating status which allows the operating mode to be switched at step S67. If dynamic operation is not allowed by a service provider or an owner, current mode is maintained, and it is determined whether subscriber service is currently ongoing at step S612.

If the subscriber service is currently ongoing, the process goes to step S614 where interference is avoided using power control. In contrast, if the subscriber service is not currently ongoing, the process advances to step S613 where transmission power is minimized by setting idle mode, thereby avoiding an interference situation.

Meanwhile, if it is determined that the femtocell 40 is in dynamic operating status which allows the operating mode to be switched at step S67, the process proceeds to step S68. In step S68, it is determined whether the QoS for a subscriber currently using the service can be maintained and it is determined whether a set wireless resource threshold value has been reached at step S69 if the QoS for the subscriber can be maintained.

However, if it is determined at step S68 that the QoS for the subscriber currently using service cannot be maintained or if it is determined at step S69 that a set wireless resource threshold value has been reached, the QoS for the subscriber is ensured by maintaining closed mode while avoiding interference using power control at step S614.

If it is determined at step S69 that the QoS for the subscriber currently using the service can be maintained and if it is determined at step S68 that a wireless resource threshold value has not yet been reached, the operating mode is switched to hybrid mode and a non-subscriber terminal is induced to perform handover at step S610.

Figure 7:
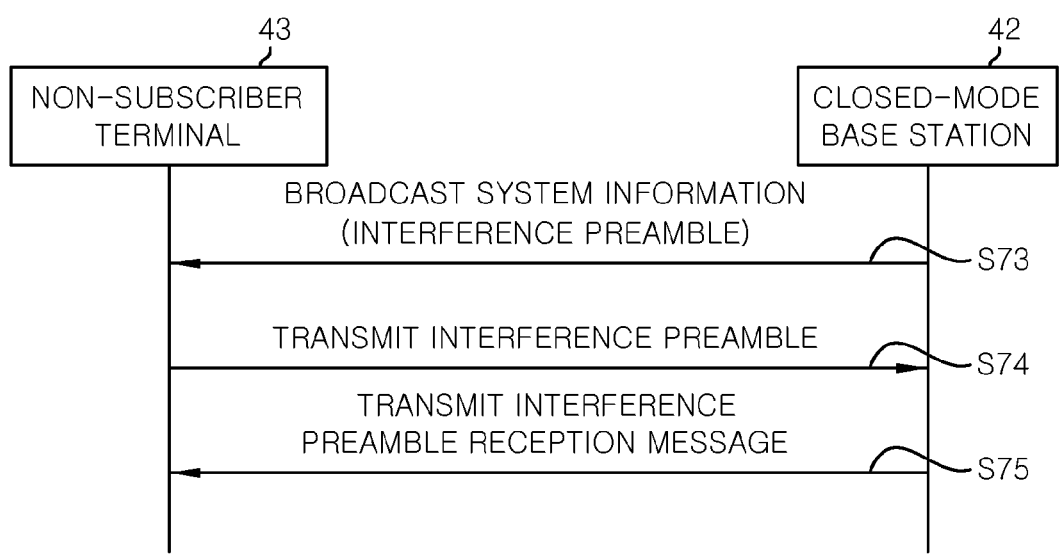
FIG. 7 is a sequential diagram illustrating a process in which a non-subscriber terminal in the service area of a closed-mode base station notifies the closed-mode base station of an interference situation using random access with reference to FIG. 4.

FIG. 7 is a sequential diagram illustrating a process in which a non-subscriber terminal in the service area of a closed-mode base station notifies the closed-mode base station of an interference situation using random access with reference to FIG. 4.

As shown in FIG. 7, the closed-mode base micro-station broadcasts an agreed interference preamble providing notification that the non-subscriber terminal 43 has entered a service area 40 of the closed-mode base micro-station 42 using the broadcast of system information at step S73.

When the non-subscriber terminal 43 has entered the service area of the closed-mode micro-base station 42, the non-subscriber terminal 43 transmits the interference preamble, which is acquired from the broadcast of system information, to the closed-mode base station at step S74.

The closed-mode micro-base station 42 transmits a reception message of the interference preamble to the non-subscriber terminal 43 in order to prevent the repeated transmission of a service request from the non-subscriber terminal 43 and the further progress of a call procedure. In response thereto, the non-subscriber terminal 43 becomes aware that the closed-mode micro-base station 42 has been notified of its interference situation, and then stops the transmission of the preamble.

In accordance with the present invention, the inventive method has the advantages of preventing the call of a terminal, which is located in an area where closed-mode base stations are distributed and is accessing a macro-base station, from being interrupted because the terminal is a non-subscriber even when the intensity of signals from a closed-mode base station is high, avoiding the interference of the non-subscriber terminal with a surrounding closed-mode micro-base station, and increasing the utilization of a frequency resource, thereby improving the QoS of wireless communication.

Furthermore, the present invention has the advantage of preventing a terminal, which is located in the service area of a surrounding closed-mode micro-base station and is accessing a macro-base station, from interfering and being subjected to the interruption of a call, thereby increasing the efficiency of the utilization of wireless resources.

While the invention has been shown and described with respect to the preferred embodiments, it will be understood by those skilled in the art that various changes and modifications may be made without departing from the spirit and scope of the invention as defined in the following claims.

What is claimed is:

1. A method of operating a closed-mode base station, comprising:
   broadcasting system information that indicates an interference preamble for providing a notification of an interference situation;
   receiving the interference preamble from a non-subscriber terminal in a service area of the closed-mode base station;
   checking current service status of the closed-mode base station in response to the interference situation being reported from the non-subscriber terminal; and
   avoiding the interference situation based on the checked current service status.

2. The method of claim 1, further comprising stopping the broadcasting of the interference preamble in response to the receipt of the interference preamble from the non-subscriber terminal that transmits, to the closed-type base station, the interference preamble having been obtained from the broadcasted system information.

3. The method of claim 1, wherein said avoiding the interference situation comprises:
   if the current service status does not allow dynamic operation,
   checking whether or not a subscriber service is ongoing; and
   performing a transition of the closed-mode base station to an idle mode in response to a determination that the subscriber service is not ongoing, thereby minimizing transmission power of the closed-mode base station.

4. The method of claim 1, wherein said avoiding the interference situation comprises:
   if the current service status does not allow dynamic operation,
   checking whether or not a subscriber service is ongoing; and
   performing a power control of the closed-mode base station in response to a determination that the service is ongoing, thereby avoiding the interference situation.

5. The method of claim 1, wherein said avoiding the interference situation comprises:
   if the current service status does allow dynamic operation, determining whether or not Quality of Service (QoS) for the non-subscriber terminal can be maintained; and
   performing a power control of the closed-mode base station in response to a determination that the QoS cannot be maintained, thereby avoiding the interference situation.

6. The method of claim 5, wherein said avoiding the interference situation comprises:
   if the current service status does allow dynamic operation, determining whether or not a wireless resource is being utilized; and
   switching the closed-type base station to hybrid mode in response to a determination that the wireless resource does reach a threshold value, thereby inducing the non-subscriber terminal to perform handover.

7. The method of claim 1, wherein said avoiding the interference situation comprises:
   if the current service status does allow dynamic operation, determining whether or not Quality of Service (QoS) for the non-subscriber terminal currently using the service can be maintained; and
   switching the closed-type base station to hybrid mode in response to a determination that the QoS can be maintained, thereby inducing the non-subscriber terminal to perform handover.

8. The method of claim 1, wherein said avoiding the interference situation comprises:
   if the current service status does allow dynamic operation, determining whether or not a wireless resource is being utilized; and
   performing a power control of the closed-mode base station in response to a determination that the wireless resource does not reach a threshold value, thereby avoiding the interference situation.

9. A method of operating a non-subscriber terminal requesting a service within a service area of a closed-type base station, comprising:
   searching a surrounding wireless environment;
   if the closed-mode base station is detected, measuring intensity of signals received from the closed-mode base station;
   comparing the intensity of the signals received from the closed-mode base station with the intensity of signals received from a currently accessed base station; and
   if the intensity of the signals received from the closed-mode base station is higher, reporting an interference situation to the closed-mode base station.

10. The method of claim 9, wherein said reporting the interference situation comprises transmitting an interference preamble that is used to provide notification of the interference situation from the non-subscribed terminal to the closed-type base station using a random access procedure,
   wherein the interference preamble having been obtained via broadcast information broadcasted by the closed-mode base station.

11. The method of claim 10, further comprising stopping the transmission of the interference preamble when the non-subscriber terminal receives a reception message of the interference preamble from the closed-mode base station.

12. The method of claim 9, further comprising:
   determining whether or not the non-subscriber terminal has been subscribed to the closed-mode base station; and
   when the non-subscriber terminal has not been subscribed to the closed-mode base station, performing handover of the non-subscriber terminal.

13. A method of operating a non-subscriber terminal, comprising:
   receiving, from a closed-mode base station, system information that indicates an interference preamble for providing a notification of an interference situation; and
   transmitting the interference preamble from the non-subscriber terminal to the closed-mode base station if the non-subscriber terminal is in a service area of the closed-mode base station, the non-subscriber terminal being a non-subscriber to the closed-mode base station.

14. The method of claim 13, further comprising stopping the transmission of the interference preamble if the non-subscriber terminal receives a reception message of the interference preamble from the closed-mode base station.

15. The method of claim 13, wherein the transmission of the interference preamble from the non-subscriber terminal to the closed-mode base station is performed according to a random access procedure.

16. The method of claim 13, further comprising performing handover of the non-subscriber terminal.

17. The method of claim 13, wherein the closed-mode base station corresponds to a femto-cell that supports a closed subscriber group (CSG) comprising subscriber terminals other than the non-subscriber terminal.

* * * * *